Oct. 19, 1943.    H. A. TOULMIN, JR    2,332,031
METHOD OF PRODUCING IRREGULAR FINISH
Filed March 13, 1939

Inventor
HARRY A. TOULMIN JR.
By
Attorneys

Patented Oct. 19, 1943

2,332,031

UNITED STATES PATENT OFFICE 2,332,031

METHOD OF PRODUCING IRREGULAR FINISHES

Harry A. Toulmin, Jr., Dayton, Ohio, assignor, by mesne assignments, to The Commonwealth Engineering Company of Ohio, Dayton, Ohio, a corporation of Ohio Application March 13, 1939, Serial No. 261,677

1 Claim. (Cl. 117—37)

My invention relates to paints, varnishes and enamels, and in particular to irregular finishes.

It is the object of my invention to provide an irregular-finished paint, varnish or enamel surface which is formed with irregular projections, preferably in irregular arrangement, upon the drying or baking of the finish.

It is an object to provide a liquid finish which can be applied by brushing, spraying or any other means of coating which, upon being heated, will assume an irregular finish of the character desired.

It is a further object to provide such a finish by the use of paints, enamels and varnishes that ordinarily do not "wrinkle" or assume upon drying or baking, or both, predetermined irregular finishes.

It is an object to provide means of causing irregular finishes without the use of such materials as China-wood oil and other vegetable oils or without the use of synthetic resins utilized to cause irregular finishes upon drying or baking.

In particular it is the object of this invention to provide a gas-forming substance which can be mixed with the enamel, paint or varnish finish during the course of its manufacture, or later. This gas-producing substance is of such character that when the finish is baked or otherwise heat treated, the gas-producing substance will gasify, forming bubbles within the finish.

It is the object of this invention to regularly distribute this gas-producing substance in independent bodies so that when the substance gasifies, the irregularities on the surface will be of uniform character and of substantially uniform disposition throughout the surface.

It is a further object to provide a paint, varnish or enamel finish of such consistency that when the gasification takes place, the bubbles formed will be included within the body of the finish and will not expand to the point of breaking open and discharging through the surface of the finish, with the result that the finish will present a smooth and unbroken surface but of irregular character due to the included gas bubbles beneath the surface of the finish.

Referring to the drawing.

Figure 1:
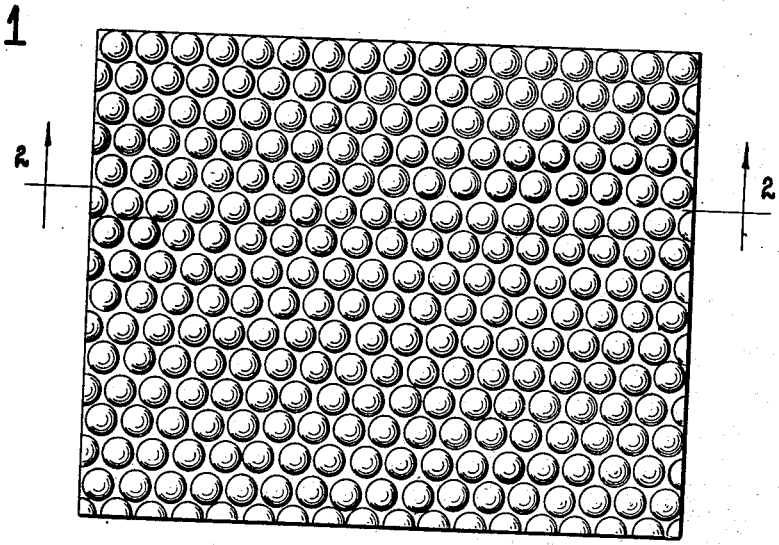
Figure 1 is a plan view diagrammatically illustrating the appearance of the surface after heat treatment when the surface has been covered with the product of this invention and has been treated according to the process of this invention.
Figure 2:
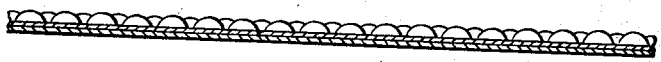
Figure 2 is a section on the line 2—2 on Figure 1 looking in the direction of the arrows.
Figure 3:
Figure 3 is a diagrammatic view enlarged showing in section a paint film or coating in which is included the gas-forming substance.
Figure 4:
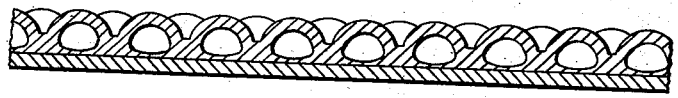
Figure 4 is a similar view enlarged showing the result of the gasification of the gas-producing substance.

It will be understood that in the art of paint, varnish and enamel finishes, particularly where only a single coat is to be applied, it is highly desirable to have an irregular finish which will cover the defects of the underlying surface. For instance, in the case of sheet metal structures that are welded, a single coat of irregular surfaced material will present an attractive appearance without disclosing the irregularities that lie beneath the finish, which would appear if the finish were smooth.

The practice of this process consists of the following steps:

I. The production of a paint, varnish or enamel vehicle.

II. The incorporation and dispersion throughout that vehicle of a gas-producing substance, of which sodium carbonate, capable of producing carbon dioxide gas, is a typical example.

III. The application of the gas-producing vehicle to a surface.

IV. The application of heat to either cause the coating material to dry and the gas-producing material to gasify or to cause the baking of the coating material, the solidification and hardening of the coating material, and the simultaneous gasification of the gas-producing material to an extent sufficient to give an irregular surface to the finish when it is finally dried, gasified and baked.

In the practice of this process and in the production of the product, there may be employed any one of the conventional varnish, paint, enamel, lacquer and synthetic resinous coating compositions.

EXAMPLE I

A typical varnish or enamel is as follows:

Varnish A

| | Pounds |
|---|---|
| Ester gum (Congo resin may be substituted) | 100 |
| Boiled linseed oil | 200 |
| Manganese tungate drier | 10 |
| Lead tungate drier | 8 |
| Petroleum naphtha | 250 |

In making the varnish the oil and resin are melted together at approximately 375 degrees Fahrenheit. The temperature is raised to 470 degrees Fahrenheit and maintained at that temperature for about one hour The driers are added at about 450 degrees Fahrenheit and the varnish is bodied to the desired viscosity while holding the temperature at approximately 450 degrees Fahrenheit for three-fourths of an hour to an hour.

An enamel may be made by mixing with the above varnish a pigment. The pigment is ordinarily ground in boiled linseed oil and mixed with the varnish composition.

EXAMPLE II

A white enamel may comprise the following formula:

Varnish A _____ gallons __ 20
Paste composed of titanium dioxide ground in boiled linseed oil or a long oil spar varnish _____ pounds __ 125
Thinner composed of equal parts toluol and petroleum naphtha _____ gallons __ 1½ to 2

This enamel can be applied to metal by spraying or flowing and it is baked at a temperature of 300 to 400 degrees Fahrenheit for 1½ to 2 hours.

It will be appreciated that the varnish and enamel formula may be varied to comprise the use of other drying oils such as wood oil, perilla or soya bean oil or suitable mixtures thereof. Further, natural or synthetic resins may be employed in place of rosin ester gum. Other driers, i. e., cobalt or manganese linoleate also may be used in place of tungates.

Baking japans are made similar to the above varnish but instead of resin asphaltum, i e., gilsonite is employed. The baking is done on metal surfaces at between 400 to 525 degrees Fahrenheit for three to four hours. This temperature readily melts and disperses the gilsonite throughout the coating, producing a pleasing finish having a high luster.

My invention is also adapted for use in connection with the conventional forced air dry and low temperature baking nitrocellulose lacquers.

| | Parts |
|---|---|
| Pyroxylin (nitrocellulose) | 15 |
| Acetone | 50 |
| Rosin | 10 |
| Polymerized China-wood oil | 10 |
| Pigment | 15 |
| Ethyl alcohol | 120 |
| Benzol | 25 |

The above composition may be applied as a liquid coating and force air dried at 120 to 150 degrees Fahrenheit for three quarters of an hour to an hour. Metallic driers may be incorporated in the drying oil if desired to accelerate the drying time of the film. Likewise other resins may be substituted for rosin, i. e., copal, sandarac or synthetic resins. Ethyl acetate and methyl alcohol may be employed in place of ethyl alcohol if desired. The essential feature is the incorporation of a suitable gas evolving agent which will function at the temperature of baking or drying the finish to produce this irregular wrinkle surface.

EXAMPLE III

The following compounds which evolve gas at relatively low temperatures and which are adapted for use in my invention are as follows:

Sodium bicarbonate ($NaHCO_3$) evolves $CO_2$ at 518° F. (270° C.).
Zinc carbonate ($ZnCO_3H_2O$) evolves $CO_2$ at 572° F. (300° C.).
Selenium sulfoxide ($SeSO_3$) evolves $SO_2$ at 104° F. (40° C.)
Palladium dioxide ($PdO_2$) evolves oxygen at 392° F. (200° C.).
Manganese dioxide ($MnO_2$) evolves oxygen at 446° F. (230° C.).
Iridic oxide ($IrO_2$) evolves oxygen at 752° F. (400° C.).
Chromium dioxide ($CrO_2$) evolves oxygen at 572° F. (300° C.).
Cesium bicarbonate ($CsHCO_3$) evolves $CO_2$ at 347° F. (175° C.).
Bismuth pentoxide ($Bi_2O_5$) evolves oxygen at 302° F. (150° C.).
Aurous oxide ($Au_2O$) evolves oxygen at 401° F. (205° C.).

A typical paint has the following composition:

| | Percent by weight |
|---|---|
| Pigment | 60 to 70 |
| Vehicle | 40 to 30 |

The vehicle may consist of raw or boiled linseed oil. A varnish type vehicle is usually employed which consists of boiled linseed oil with rosin or fossil gums dissolved in the hot oil. Driers such as cobalt or manganese linoleate or resinate, lead oxide, etc., are incorporated in small amounts to accelerate the drying of the paint film. Turpentine, petroleum, naphtha, or benzine and the like are also added as a thinner to produce a paint of suitable consistency for application as a coating.

The pigments used are ground to a paste in a portion of the vehicle in linseed oil on a paint mill. An appropriate amount of paste is then thoroughly mixed with the vehicle to form the finished paint. The pigment or coloring ingredients for compounding the paint depends upon the color and covering property of the product desired. In manufacturing white paints titanium oxide, zinc oxide, lithopone, barytes, china clay, or mixtures of these materials may be selected. Color pigments for tinting comprise the natural mineral substances, i. e., sienna, umber, iron oxide, etc., and chemically made pigments such as Prussian blue, chrome green, carbon black and others which are available. Paints of practically any desired tint or shade may be produced in this way.

To the foregoing there is added any gas-producing material, of which sodium bicarbonate is typical. It is preferred in practice to introduce this in granular form of uniform grain size. This ensures even distribution of predetermined amounts throughout the liquid so that when it is applied, baked and gasified, the irregularities caused by the gas bubbles will be substantially uniformly spaced from one another. The size of the grain or pellet will determine the size of the resulting gas bubble, depending upon the degree of heat applied and the extent and completeness of the gasification.

The sodium bicarbonate thus incorporated may be either incorporated just before application or at an earlier stage of manufacture as desired. It may be incorporated as a powder where a small amount of gasification and irregularity is desired.

When this product has been applied to a surface to be coated, it is then heated in the usual manner to either dry or bake the surface. As sodium bicarbonate gasifies at approximately 518 degrees Fahrenheit, the temperature of the drying or baking should be adjusted accordingly. It is desirable to keep the temperature below gasification or utilize a current of air, or air and heat, below the temperature of gasification sufficiently long to cause the material thus applied to the surface to begin to solidify and to acquire a substantially surface thickness due to the drying or baking operation so that a relatively tough body is formed in the varnish, paint or enamel to resist the stretching of that body due to the variation of the carbon dioxide gas when the temperature is raised to cause gasification. It is preferred, but it is not essential, to carry gasification to the point to cause a surface that is pebbled to imitate grain leather, but it is preferred not to carry it to the point where the gas will rupture the surface of the coating material and escape, as this leaves an irregular, rough surface which in many cases would be undesirable for commercial usage.

If it is desired to incorporate this gas-producing material with enamels and the like that contain wrinkling oils such as China-wood oil, so as to combine the irregularities of gasification with the irregularities of wrinkling, the following formula may be used for preparing the enamel:

| | | |
|---|---|---|
| Congo | pounds | 25 |
| Rosin | do | 1¼ |
| Red lead | ounces | 7 |
| Borate of manganese | do | 3 |
| China-wood oil | gallons | ⅝ |
| Blown wood oil | do | 1⅝ |
| Toluol | do | 5¾ |

The gasifying material such as sodium bicarbonate can be added to this enamel as heretofore described. The proportion of the sodium bicarbonate and the size of the particles, grains or pellets, depend upon the extent and size of the gasification desired.

The temperature required in order to cause this enamel to bake and gasify is a temperature of 180 degrees Fahrenheit for approximately 5 hours, 3 hours at 200 degrees Fahrenheit, 2 hours at 250 degrees Fahrenheit, 1½ hours at 300 degrees Fahrenheit, and ¾ of an hour at 400 degrees Fahrenheit.

It will be understood that if the gasification has been brought to the point where it is desired, it is desirable to simultaneously bring the solidification of the finish to such a point that it will resist any escape of the gas and therefore any high temperatures can be safely utilized to complete the baking operation, as the rigidity and strength of the finish will be sufficient to prevent the exploding of the bubble and the escape of the gas.

It will be further understood that suitable additional driers may be employed in association with the gas producing substance such as sodium carbonate in order to facilitate and accelerate the drying of the coating. Such driers as cobalt linoleate, lead linoleate or manganese linoleate, or any similar driers may be employed.

It will be understood that a variety of gas-producing materials may be employed. In some instances the varnish, enamel or paint may be impregnated by carbon dioxide gas, which is either bubbled through it or mixed with it under pressure, or solid carbon dioxide may be utilized. There may be various substitutions of materials and methods of applying materials to accomplish the result desired without departing from the scope of this invention.

It will be understood that I desire to comprehend within my invention such modifications as come within the scope of the claim and the invention.

Having thus fully described my invention, what I claim as new and desire to secure by Letters Patent is:

In a method of producing a coating comprising a pebbled surface which is substantially continuous over the entire surface of the coating film, the steps of producing a composition containing resin and vegetable drying oil, adding a gasefying material and subjecting a surface to which the mixture has been applied to heat at a temperature of 180° F. for approximately 5 hours, raising the temperature to 200° F. and maintaining such temperature for 3 hours, raising the temperature to 250° F. and maintaining for approximately 2 hours, raising the temperature to 300° F. and maintaining for approximately 1½ hours, and raising the temperature to 400° F. and baking with maintenance of this temperature for approximately ¾ of an hour.

HARRY A. TOULMIN, Jr.